Oct. 7, 1930. R. C. CHATTIN 1,777,688
AUXILIARY RUDDER FOR IRRIGATION DITCHERS
Filed May 22, 1929
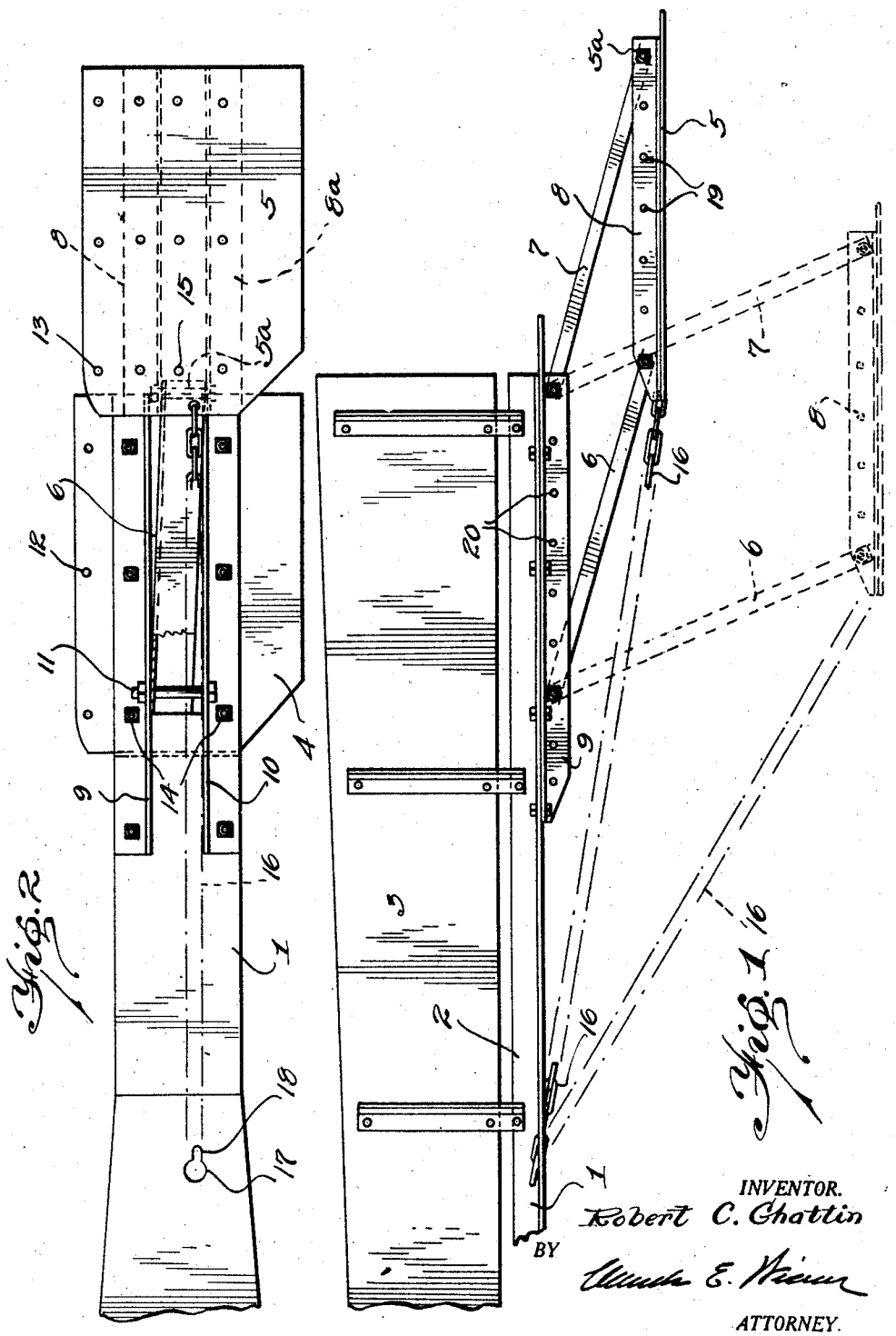
INVENTOR.
Robert C. Chattin
BY
ATTORNEY.

Patented Oct. 7, 1930

1,777,688

UNITED STATES PATENT OFFICE

ROBERT C. CHATTIN, OF BOISE, IDAHO, ASSIGNOR, BY MESNE ASSIGNMENTS, TO BURNHAM MANUFACTURING COMPANY, OF BOISE, IDAHO, A CORPORATION OF UTAH

AUXILIARY RUDDER FOR IRRIGATION DITCHERS

Application filed May 22, 1929. Serial No. 365,101.

This invention relates to auxiliary rudder or tail piece for the land sides of irrigation ditchers such as is shown by my prior Patent No. 1,703,098 granted February 26, 1929.

The object of the invention is to provide an additional means by which the land side of the ditcher is held in parallel relation with the ditch bank being worked and further to cause the forward earth cutting parts of the ditcher to make a better cut and to deliver the cuttings further up on the ditch bank from the wing side of the ditcher in a more satisfactory manner than previous constructions.

In large ditches having a wide bottom a single guide plate or rudder on the land side of the ditcher as in former constructions is often insufficient to hold the land side parallel with the ditch bank unless a considerable additional weight is placed on the rear end of the machine. With the adjustable auxiliary rudder hereinafter described the weight of the rear end of the machine is increased materially and the land side is held more securely from lateral movement due to the increased surface of the rudders cutting into the ground. Further, by use of the auxiliary rudder such as herein disclosed a much wider ditch may be worked with the same machine due to the fact of the land side being held parallel and out of contact with the ditch bank adjacent the land side of the machine.

A further object of the invention is to provide an auxiliary rudder that is adjustable to various distances relative to the land side of the ditcher and always in parallel relation therewith.

A further object is to provide a detachable auxiliary rudder or tail piece for the general purpose above described.

The preferred embodiment of the invention is shown in the accompanying drawings in which—

Fig. 1 is a plan view of the rear end of a land side of an irrigation ditcher showing my improved auxiliary rudder in connection therewith.

Fig. 2 is a side elevation from the land side of Fig. 1.

As is usual with irrigation ditchers the forward end of the machine is similar to a plow and the land side herein indicated is the rear portion of the land side of an irrigation ditcher, the front portion thereof not being shown. This land side 1 is usually a metal plate adapted to be utilized in a vertical plane and is usually provided with a flange 2 on the inside thereof to which is attached a plate 3 on which the operator may stand or on which weights may be placed when it is desired to cause the rudder to enter the ground with greater certainty. A rudder 4, as will be observed from Fig. 2, is attached to the rear end of the land side 1 and extends to a distance therebelow and the forward edge of the main rudder slopes forwardly and upwardly to approximately the lower edge of the land side 1.

The main rudder, in the operation of the ditcher, cuts into the surface of the ground and tends to hold the land side from being swerved out of parallel relation with the adjacent ditch bank by the pressure of the earth removed by the wing side as will be readily understood by those familiar with this form of ditcher. It often happens and especially with hard surfaced ground that the lower edge of the rudder does not readily enter the ground materially below the lower edge of the land side 1 and for this purpose it has heretofore been the practice to weight the rear end of the machine to insure the main rudder cutting into the ground to an extent to hold the land side from being swerved out of parallelism with the adjacent ditch bank.

By my improved attachment I am able to double or more than double the amount of rudder surface that enters the ground and thus with greater certainty hold the land side of the machine from being swerved.

The preferred construction of an auxiliary rudder and the manner of its adjustment is shown fully in the accompanying drawings in which 5 indicates the auxiliary rudder which is practically a duplicate of the main rudder 4 attached to the land side. This rudder 5 is provided with a pair of links 6 and 7 of channel form pivotally attached at one end to the front and rear respectively of the auxiliary rudder 5 by means of bolts $5^a$ which extend through a flange 8 provided on the inner face of the auxiliary rudder and apertured to receive the bolts. There is also provided on the auxiliary rudder a second flange 8ª shown in dotted lines in Fig. 2 in spaced relation with the flange 8 through which the bolts 5ª extend.

The land side 1 is also provided with an apertured flange 9 of angle iron form bolted thereto and a similar flange 10 in spaced relation therebelow as indicated in Fig. 2. The links or channel bars 6 and 7 are attached at their inner ends to bolts 11 passing through the apertures in the flanges 9 and 10 on the land side. It is to be noted that the bolts by which the members 8 and 8ª and the members 9 and 10 are secured to the respective rudders are removable and that the main and auxiliary rudders are respectively provided with rows of upper bolt apertures 12 and 13 and rows of bolt apertures with intermediate rows on the main rudder for the bolts 14 and 15 on the auxiliary rudder enabling the rudders to be raised or lowered relative to the land side 2 thus permitting the rudders to cut into the ground to a greater or less extent as may be found desirable according to the looseness or hardness of the soil. The members 6 and 7 are formed of channel iron and fit between the outwardly projecting flanges of the angle irons attached to the respective rudders.

By means of these channel iron bars or connecting links 6 and 7 the auxiliary rudders may swing forwardly or backwardly of the position shown in Fig. 1 the forward position being shown in Fig. 1 by dotted lines and to maintain the auxiliary rudder in any adjusted position I provide a chain 16 connected at the forward edge of the auxiliary rudder after the manner indicated and extending forwardly thereof and connected to the land side which is provided with a keyhole slot 17 permitting a portion of the chain to be passed therethrough and a link of the chain inserted in the narrow or slot like portion 18 of the aperture.

By pulling the chain forwardly through the aperture the auxiliary rudder is brought outwardly from the land side and by increasing the length of the chain by pulling the same rearwardly through the aperture it is brought to closer relation with the land side. In any position of adjustment it is to be noted that the plane of the auxiliary rudder is always parallel with the plane of the land side and main rudder 4. The flanges 8 and 8ª and 9 and 10 are provided with a series of apertures 19 and 20 respectively which permits various adjustments of the auxiliary rudder forwardly or backwardly of the position shown. Thus, all desirable adjustments of the auxiliary rudder relative to the main rudder may be accomplished by a simple and inexpensive structure and its distance from the land side may be quickly varied as occasion demands. By attaching the members 6 and 7 to the angle irons 9 and 10 on the land side by means of removable bolts the auxiliary rudder is made readily attachable or detachable so that the ditcher may be used in the formation of ditches of various widths. If the ditch be narrow it may be unnecessary to utilize the auxiliary rudder and if wide the auxiliary rudder is used to increase the resistance of the land side from being moved out of parallelism with the adjacent bank with which it is out of contact. Thus, the ditcher is adapted by my improved auxiliary rudder for use with ditches of varying widths and its utility therefore increased.

Having thus briefly described my invention, what I claim and desire to secure by Letters Patent of the United States is—

1. The combination with a land side of an irrigation ditcher having a rudder at its trailing end adjustable vertically relative thereto to increase or decrease the depth to which the bottom edge of the rudder may enter the ground, of an auxiliary rudder consisting of a plate, means for connecting the plate to the land side to hold the same in parallel relation with the rudder, means for varying the position of the auxiliary rudder toward or from the land side, and means for adjusting the auxiliary rudder in a vertical plane relative to the land side.

2. The combination with the land side of an irrigation ditcher having a plate at its trailing end extending below the lower edge of the land side and providing a main rudder, of an auxiliary rudder consisting of a similar plate, a pair of spaced bars pivoted to the land side and to the auxiliary rudder on vertical axes, means for varying the points of pivot connection of the bars forwardly or backwardly relative to the auxiliary rudder, and an element connecting the auxiliary rudder to the land side at a point forward of the main rudder by which the auxiliary rudder may be adjusted forwardly or rearwardly in a plane parallel with the plane of the land side and its distance from the face of the land side thereby increased or decreased.

3. The combination with the land side of an irrigation ditcher having a plate at its trailing end providing a rudder the lower edge of which enters the ground surface in the operation of the ditcher, of an auxiliary rudder consisting of a similar plate, means for attaching the auxiliary rudder to the land side, said means being adapted to maintain the auxiliary rudder in a plane parallel with the land side and main rudder, means for adjusting the position of the auxiliary rudder to a greater or less distance from the land side, and means for adjusting the auxiliary rudder in a plane parallel with the plane of the main rudder to increase or decrease the depth to which the auxiliary rudder may enter the ground.

4. The combination with the land side of an irrigation ditcher having a main rudder at its trailing end, of an auxiliary rudder similar in form, the auxiliary rudder and land side each being provided with a lateral flange on the adjacent faces of the respective members, a pair of bars pivotally connected at the opposite ends with the respective flanges permitting the rudder to swing about the points of connection with the land side and adapted to maintain the auxiliary in a plane parallel with the main rudder, a flexible element connecting the forward end of the auxiliary rudder to the land side at a distance forward of the main rudder, means for varying the length of the flexible member whereby the position of the auxiliary rudder relative to the land side may be determined.

5. In an irrigation ditcher, a land side occupying a vertical plane, a plate detachably secured to the trailing end thereof and adjustable in a vertical plane to vary the depth to which the rudder may enter the surface of the ground, an auxiliary rudder pivotally connected to the outer face of the land side, said auxiliary rudder consisting of a plate, a pair of vertically spaced lateral flanges on adjacent faces of each of the land side and auxiliary rudder, both said pair of flanges having a series of apertures therein extending longitudinally of the flanges, a bar having end portions fitting between the flanges of the respective members at the opposite ends of the bar, each of said ends having an aperture to register with the apertures of the respective flanges, a second bar of the same character extending between the flanges in spaced relation with the first bar, bolts extending through said flanges and bar ends providing pivotal connections between the auxiliary rudder and the land side and permitting movement of the auxiliary rudder forwardly or backwardly in a vertical plane with consequent variation in distance of the auxiliary rudder from the land side, a flexible element connected to the auxiliary rudder and connected with the land side considerably forward of the main rudder and adjustable in length to cause the auxiliary rudder to assume a predetermined position and distance from the land side, the said bars being adjustable forwardly or backwardly in the said flanges, said auxiliary rudder further having a series of apertures permitting the flanges to be attached thereto at various distances from the bottom edge to vary the depth to which the auxiliary rudder may enter the ground.

In testimony whereof I sign this specification.

ROBERT C. CHATTIN.